March 31, 1931.  B. E. G. MITTELL  1,798,891
SOUND RECORDING AND REPRODUCING MACHINE
Filed March 18, 1927
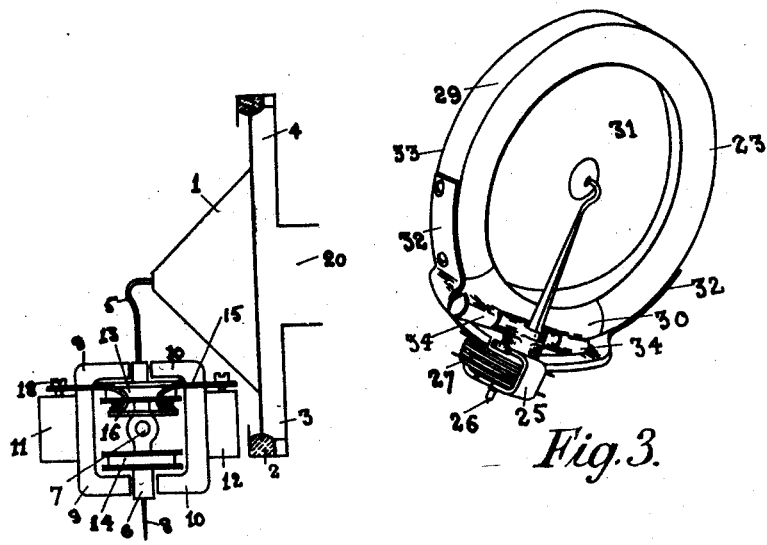
Fig.1.
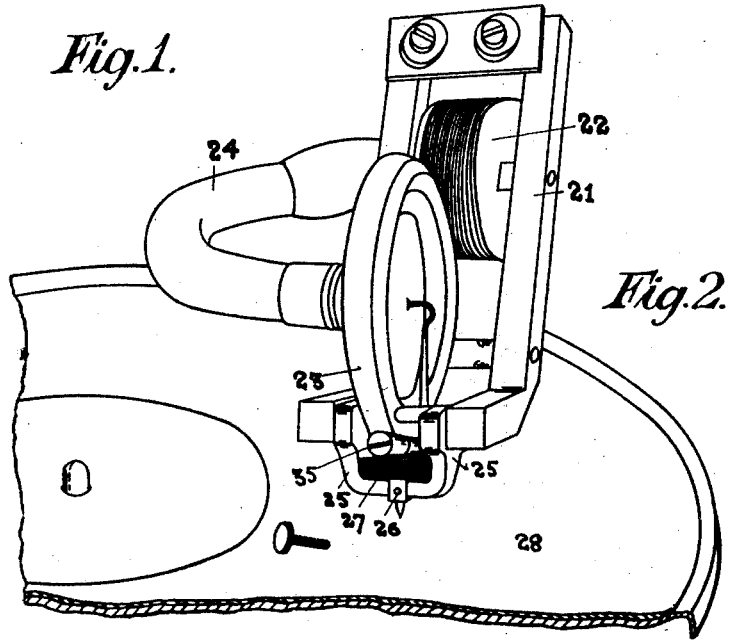
Inventor
Brenchley Ernest George Mittell,
By
Munro, Cameron, Lewis & Kerkam
attorneys Patented Mar. 31, 1931

1,798,891

UNITED STATES PATENT OFFICE

BRENCHLEY ERNEST GEORGE MITTELL, OF IVER, ENGLAND, ASSIGNOR TO VICTOR TALKING MACHINE COMPANY, A CORPORATION OF NEW JERSEY

SOUND RECORDING AND REPRODUCING MACHINE

Application filed March 18, 1927, Serial No. 176,484, and in Great Britain March 26, 1926.

This invention relates to improvements in sound recording and reproducing machines.

The objects of the invention are to provide a machine adapted to reproduce in the ordinary manner from a talking machine record, that is to say adapted to produce sound by means of a diaphragm or plunger vibrated by a stylus through the intermediary of a stylus bar, which machine, without its ability to reproduce sound in this ordinary manner being in any way impaired, is nevertheless adapted, when required, to reproduce sound by electrical means, as for example by current fluctuations due to the vibration of the stylus, amplified by suitable thermionic means and operating a loud speaker; to provide a machine which is adapted simultaneously to reproduce sounds mechanically as does the ordinary talking machine and to produce sounds electrically; to provide a machine in which the reproduction of sounds electrically can be effected simultaneously with the reproduction of sound mechanically without in any way impairing the mechanical reproduction; to provide a mechanical sound reproducing machine having a member adapted to be vibrated by a record and by its vibration to produce or to vary an electrical current or oscillations therein, in which the freedom with which the vibrating member moves during mechanical reproduction is not appreciably affected when the instrument is used to reproduce electrically.

As applied to recording, where an electrical system is employed, the invention provides a novel form of damping or loading for the recording stylus and in one form facilitates "monitoring", that is, it enables the operator to follow audibly and to regulate the strength and nature of the oscillations which are being conveyed from a microphone to the recording stylus.

Experience has shown that where a talking machine record is used to vibrate a stylus and stylus holder, and the vibrations of the stylus holder are used to produce or to vary electrical currents or oscillations, it is necessary to provide means for damping or loading the vibrating stylus holder, in order to prevent the undue emphasis of frequencies in the neighbourhood of the natural resonant frequencies of the stylus holder or other part of the vibrating system which cause unsatisfactory reproduction. Hitherto in electrical reproducing machines where the reproducing stylus has been carried in a stylus holder adapted to oscillate in suitable bearings, it has been customary to provide damping or loading means in the form of india rubber or a similar elastic substance packed around a portion of the stylus holder or its bearings. The use of such damping or loading means must necessarily affect and impair the vibration of the stylus holder as it would be required to operate if there were connected thereto a diaphragm or plunger as in the case of the ordinary talking machine that reproduces mechanically.

According to one aspect of the present invention, the vibrations of the stylus are dampend by means of a fluid column such as a column of air contained within a tube or a horn and set in vibration by the stylus through the intermediary of a diaphragm or plunger. When a horn is used it is preferably of the exponential type and it also serves to render audible the oscillations which are being recorded.

According to another aspect of the present invention as applied to recording or reproducing devices, the provision of hitherto known damping or loading means such as above referred to, is avoided and the vibrating member is damped or loaded only by the diaphragm or plunger of an instrument, which may simultaneously give the mechanical reproduction, in association with the column of air or other fluid which is vibrated thereby. In the ordinary form of talking machine the loading will be that due to the diaphragm or plunger in association with the air chamber between the diaphragm and the amplifying horn, and in association with the impedance to the transmission of sound energy vibrations through the amplifying horn. A sound box of the usual form may for example be employed and the stylus bar may serve as the armature of an electro-magnetic recording or reproducing system. In one arrangement the pole shoes are fixed to the sound box and the permanent or electromagnet which furnishes the steady flux is fixed to that part of the sound arm which is constrained to move only in a horizontal plane. The sound box is carried upon the usual goose-neck and is capable of rising and falling with the surface of the record, whilst the pole shoes are kept, when the stylus is resting in the record groove, in close proximity to their respective magnet poles. The audio frequency current coil surrounds the stylus bar and is secured to the sound box. In another form the magnet forms part of the body of the sound box and may for example constitute part of the annular ring in which the edge of the diaphragm or plunger is supported.

The invention will be described by way of example with reference to the accompanying drawings, which drawings are for the purpose of illustration only and are not designed as a definition of the limits of the invention, reference being had to the appended claims for this purpose.

In the drawings,—

Fig. 1 is a somewhat diagrammatic view partly in section illustrating one embodiment of the present invention; and Figs. 2 and 3 are prospective views illustrating two other embodiments of the present invention.

In Fig. 1 a diaphragm or plunger 1 having a conical central portion surrounded by a flat annular portion is supported in known manner by means of a suitable rubber gasket 2 in a sound box casing 3. An air chamber 4 is provided between the diaphragm and the rear wall of the sound box casing. The apex of the conical diaphragm is connected by means of a flexible coupling 5 with an armature 6 pivoted at 7. A stylus 8 is carried in the lower end of the armature. The armature is capable of vibration between pole shoes 9 and 10 which are secured respectively to the poles 11 and 12 of a permanent or electromagnet. Audio frequency current coils 13 and 14 are secured to the pole shoes and surround the armature 6. The magnetic forces upon the armature are counterbalanced by springs 15 secured at one end to a cross piece 16 fixed to the armature 6 and resting at the other end under screws 18 which screw into the magnet poles 11 and 12 and permit of the adjustment of the counterbalancing forces applied.

The aperture 20 in the rear wall of the sound box casing may be placed in connection with a horn, which is preferably of the exponential type, that is to say, a horn the cross sectional area of which increases from input to output end by a constant percentage when the measurements of area are made at a succession of equally spaced points along the horn axis. If the horn be made of sufficient length and if the size of the air chamber be correctly adjusted, the impedance offered to the vibration of the diaphragm by the column of air contained within the horn can be made substantially constant over a wide band of frequencies.

When a device of the type described is used for reproducing sounds from a record tablet the sound is reproduced in the usual manner through the horn and if desired electrical reproduction may be obtained simultaneously by feeding the electro-motive forces generated in coils 13 and 14, which may be connected in series, to a suitable amplifier and connecting the out-put of the amplifier to a reproducing device or loud speaker which may be placed in the same room as the mechanical reproducer or which may be in another room. The diaphragm and the column of air vibrated thereby serve to damp or load the electrical reproducer and other damping means are unnecessary. When applied to recording sounds, the electrical oscillations fed to coils 13 and 14 operate the recording stylus and at the same time cause the diaphragm 1 to vibrate and reproduce sounds corresponding to the sounds which are being recorded. The necessary loading or damping is in this case also supplied by the column of air in the horn and the mechanical reproduction also permits audible monitoring of the recording so that the necessary adjustments may be made to the recording apparatus during the recording process.

Instead of a horn a tube of considerable length may be employed either in recording or in reproducing devices. In this case if the tube is not made of sufficient length to provide constancy of impedance over the desired band of frequencies, the tube may be made of flexible material such as rubber, and this flexibility may be made to contribute substantially to the desired damping of the waves transmitted through it. In some cases the far end of the tube is left open and in other cases it is closed.

In Figure 2 is illustrated a device, according to the invention, which is more particularly intended for reproducing although it may also be employed for recording.

The electro-magnet 21 is energized by means of a coil 22 and is secured to that portion of the sound arm of a talking machine which is constrained to move in a horizontal plane only. The sound box 23 is secured in the usual manner to the goose-neck 24 and is capable of rising and falling between the magnet poles. Attached to the sound box are two lugs 25, the upper ends of which are in the neighbourhood of the axis of vibration of the stylus bar 26. The lower ends of the lugs 25 are on opposite sides of and close to the lower end of the stylus bar 26. The audio frequency current coil 27 is secured to the lugs and surrounds the stylus bar. The stylus bar 26 is of usual form but is of soft iron. The sound box may be raised in the usual manner when the needle is to be taken from the record surface 28 and when the machine is playing the sound box will be free to rise and fall as required with the surface of the record whilst the pole shoes or lugs 25 will remain in close proximity to the poles of the magnet 21.

When the stylus bar 26 is in its central position the flux will pass from one magnet pole, through the two limbs of the adjacent lug, through the stylus bar perpendicular to its length above and below the coil 27 and through the two limbs of the other lug to the other magnet pole. When the stylus bar is vibrated the air gaps between the upper limbs of the two lugs and the stylus bar remain practically unchanged as the stylus bar is pivoted near this point. The lower air gaps however vary and flux is thus caused to pass in one direction or the other longitudinally of the stylus bar and through the coil 27. The vibrations of the stylus bar consequently give rise to corresponding electro-motive forces in the coil.

A talking machine thus constructed will operate in the usual way exactly when reproducing mechanically. Its vibrating stylus bar is entirely unaffected by the small additions to the sound box above referred to and the quality of its reproduction will depend in known manner upon the proper balance of the several parts of the sound box, and upon the proper selection and dimensioning of their mass and elasticity, the size and shape of the air chamber between the diaphragm and the horn opening and upon the dimensions and rate of enlargement of the horn.

When it is desired to obtain electrical reproduction, the audio frequency electrical oscillations in the coil are passed through a transformer to a suitable thermionic amplifier and thence to a loud speaker, electrical reproduction in any desired volume being obtained and the quality of such electrical reproduction being entirely satisfactory. Mechanical reproduction by way of the sound box and horn proceeds of course simultaneously. Experiment shows that if a loud speaker is removed to a distance and enclosed so that it cannot be heard and the coil on the sound box is alternately connected to and disconnected from the amplifier, no difference can be detected in the quality or volume of the mechanical reproduction. This appears to be true whatever is the extent, within the ordinary limits, of the amplification of the electrical reproduction. If any appreciable effect on the mechanical reproduction is found when the electrical reproduction is in use, it is only necessary to decrease the efficiency of the electromagnetic system, for example by increasing the air gaps in the magnetic circuit, and to make up for the reduction in volume by increased amplification.

Fig. 3 illustrates a modification of the device shown in Figure 2. In Figure 3 the body of the sound box 23 is constituted in part by the permanent magnet 29. The magnet together with the brass inset 30 forms a complete clamping ring in which the diaphragm 31 is mounted in the usual manner. The pole pieces 25 are secured to the magnet poles by strips 32 projecting from the pole pieces. The coil 27 is secured to the pole pieces and surrounds the lower end of the stylus bar 26. The clamping ring is L-shaped in cross-section and may be made up as one piece with the brass inset 30 soldered in position and the whole machined so as to be mechanically exactly equivalent to existing clamping rings, and attached to the back plate 33 by three screws passing from the back plate into threaded holes in the clamping ring or alternatively the magnet and inset may be separately attached to the back plate. The brass inset is of sufficient length to carry the stylus bar bearings 34 which are fastened thereto.

The upper limbs of the pole shoes are relatively much closer to the axis of vibration of the stylus bar than the lower limbs, and the movement of the stylus bar, relatively to the upper limbs of the pole shoes, may therefore be neglected in comparison with that relatively to the lower limbs. It will be evident that when the stylus bar vibrates, since one pole shoe is oppositely magnetized to the other, flux will pass through the stylus bar, and consequently through the coil, first in one direction and then in the other direction, and electro-motive forces corresponding to the mechanical vibrations of the stylus bar will consequently be induced in the coil. These electro-motive forces may be applied, in known manner to the input circuit of an amplifier, preferably a thermionic amplifier, the output circuit of which is in operative relation with a loud speaker.

It has been found, as mentioned in connection with Figure 2, that the mechanical reproduction with a sound box constructed in the above manner, is not sensibly affected by the electro-magnetic system whilst the weight of such a sound box need be no greater than that of a sound box of the usual type, since the only parts which are added to an ordinary talking machine sound box are the polar extensions and the coil, which are of course relatively very light components, and the weight of these may readily be saved in other places.

If the generation of electrical current in the coil should be found to affect the mechanical reproduction, the magnitude of the current may be reduced, for example by increasing the air gap between the pole shoes, and the stylus bar, or by weakening the permanent magnet, and the loss in volume so occasioned may be compensated for by additional amplification.

There are many variations of the construction shown in Fig. 3 which may be made. For example a ring magnet may be used consisting of a complete annulus of magnetic material, magnetized in such a manner that the North and South poles are diametrically opposite one another and pole pieces may extend from the poles radially inwards towards the stylus bar. The coil in which audio frequency electro-motive forces are generated may surround the stylus bar in the neighbourhood of the centre of the diaphragm, and the necessary flux variations may in this case be produced by the stylus bar moving from its normal central position between the two pole pieces, and approaching first one and then the other during its vibration. Alternatively two coils, connected in series, may be provided, one surrounding each of the pole pieces, and in this case the flux variations may be produced by the stylus bar increasing or decreasing the air gap between the two pole pieces during its vibration and so varying the total reluctance of the magnetic circuit whilst remaining substantially equidistant from the two pole pieces.

I claim:

1. An electromagnetic recording or reproducing device comprising a talking machine sound box, a magnet forming a portion of the body of said sound box, a diaphragm for said box, a stylus therefor and a member constituting the armature of the electromagnetic device for connecting said stylus to said diaphragm.

2. An electromagnetic recording or reproducing device comprising a talking machine sound box having a casing, said casing comprising an annular portion constituted by a magnet, a diaphragm for the box mounted in said annular magnetic portion, a stylus, and means associated therewith including a stylus bar for connecting the stylus to the diaphragm.

3. In a device of the class described, an annular member including a magnet, a diaphragm mounted in said annular member, a stylus and stylus bar mounted on the annular member and operatively connected to the diaphragm, poles for said magnet, and a coil surrounding said stylus bar and carried by said magnet.

4. In a device of the class described, the combination of an annular magnet having a member of non-magnetic material inserted therein, pole pieces and a coil carried by said annular magnet, a stylus bar pivotally mounted on said member and vibrating adjacent said coil, and a diaphragm mounted in said annular magnet, said stylus bar being operatively connected to said diaphragm.

5. In a device of the class described, the combination of an annular member having magnetized and non-magnetic portions, a pair of pole pieces carried by said magnetized portion, a coil carried by said pole pieces, a vibratable stylus bar of magnetic material pivoted on said non-magnetic portion and extending through said coil, and a diaphragm mounted in said annular member, said stylus bar being operatively connected to said diaphragm.

6. In a device of the class described, a vibrating stylus and means whereby the vibrations of the stylus are damped by a fluid column, said means comprising a tube of substantially uniform cross section containing a fluid column, said tube being of flexible material to add substantially to the attenuation of the waves produced by said fluid column.

In testimony whereof I have signed my name to this specification.

BRENCHLEY ERNEST GEORGE MITTELL.